(12) United States Patent
Wu et al.

(10) Patent No.: US 7,493,659 B1
(45) Date of Patent: Feb. 17, 2009

(54) NETWORK INTRUSION DETECTION AND ANALYSIS SYSTEM AND METHOD

(75) Inventors: Handong Wu, Los Angeles, CA (US); Jerome Freedman, Greenbrae, CA (US); Christopher J. Ivory, Glen Rock, NJ (US)

(73) Assignee: McAfee, Inc., Santa Clara, CA (US)

( * ) Notice: Subject to any disclaimer, the term of this patent is extended or adjusted under 35 U.S.C. 154(b) by 1699 days.

(21) Appl. No.: 10/091,645

(22) Filed: Mar. 5, 2002

(51) Int. Cl.
*G06F 7/04* (2006.01)
*G06F 17/30* (2006.01)
*G06K 9/00* (2006.01)
*H03M 1/68* (2006.01)
*H04K 1/00* (2006.01)
*H04K 9/00* (2006.01)
*H04K 9/32* (2006.01)

(52) U.S. Cl. ...................................................... 726/26
(58) Field of Classification Search ................ 713/200, 713/201, 154; 726/1, 26
See application file for complete search history.

(56) References Cited

U.S. PATENT DOCUMENTS

| | | | |
|---|---|---|---|
| 4,714,992 A | 12/1987 | Gladney et al. ............. 364/200 |
| 5,278,901 A * | 1/1994 | Shieh et al. ................... 726/22 |
| 5,414,712 A | 5/1995 | Kaplan et al. ............... 371/15.1 |
| 5,751,698 A | 5/1998 | Cushman et al. ............ 370/252 |
| 5,919,257 A * | 7/1999 | Trostle ........................ 726/22 |
| 6,195,352 B1 | 2/2001 | Cushman et al. ............ 370/395 |
| 6,279,113 B1 * | 8/2001 | Vaidya ........................ 726/23 |
| 6,321,338 B1 * | 11/2001 | Porras et al. .................. 726/25 |
| 6,785,821 B1 * | 8/2004 | Teal ............................ 726/23 |
| 6,851,061 B1 * | 2/2005 | Holland et al. ................ 726/23 |
| 2003/0101358 A1 * | 5/2003 | Porras et al. ................. 713/201 |

OTHER PUBLICATIONS

Roesch, Martin, "Snort- Lightweight Intrusion Detection for Networks", Nov. 1999.

* cited by examiner

*Primary Examiner*—Kambiz Zand
*Assistant Examiner*—Farid Homayounmehr
(74) *Attorney, Agent, or Firm*—Zilka-Kotab, PC; Christopher J. Hamaty

(57) ABSTRACT

An intrusion detection and analysis system and method are disclosed. The system includes a data monitoring device comprising a capture engine operable to capture data passing through the network and configured to monitor network traffic, decode protocols, and analyze received data. The system further includes an intrusion detection device comprising a detection engine operable to perform intrusion detection on data provided by the data monitoring device. Application program interfaces are provided and configured to allow the intrusion detection device access to applications of the data monitoring device to perform intrusion detection. The system also includes memory for storing reference network information used by the intrusion detection device to determine if an intrusion has occurred.

16 Claims, 5 Drawing Sheets

NETWORK INTRUSION DETECTION AND ANALYSIS SYSTEM AND METHOD

BACKGROUND OF THE INVENTION

The present invention relates generally to communication systems, and more particularly, to a network intrusion detection and analysis system and method.

The explosion of the Internet allows companies and individuals real time access to vast amounts of information. As Internet access costs have decreased, corporations are increasingly using the Internet for corporate data and communications. The many advantages of the Internet, such as cost and flexibility are heavily impacted by security risks. Security is increasingly becoming a critical issue in enterprise and service-provider networks as usage of public networks for data transport increases and new business applications such as e-commerce sites are deployed. Security measures are required, for example, to prevent hackers from gaining unauthorized access to a corporations information resources or shutting down an e-commerce web site via a distributed denial of service attack. Corporations continue to deploy firewalls to prevent unauthorized users from entering their networks. However, corporations are looking to additional security technologies to protect their system's vulnerability that firewalls alone cannot address.

One of these additional security measures is an intrusion detection system (IDS). As network attacks have increased in number and severity, intrusion detection systems have become a necessary addition to the security infrastructure of most organizations. Intrusion detection allows organizations to protect their systems from threats that come with increasing network connectivity and reliance on information systems. Intrusion detection systems include software or hardware systems that automate the process of monitoring events occurring in a computer system or network, and analyzing them for signs of security problems. Intruders attempt to compromise the confidentiality, integrity, availability, or to bypass the security mechanisms of a computer or network. These include, for example, unauthorized users, authorized users of the systems who attempt to gain additional privileges for which they are not authorized, and authorized users who misuse the privileges given to them. Intrusion detection technology is therefore, a necessary addition to every large organization's computer network security infrastructure.

Network based intrusion detection systems (NIDSs) provide network surveillance by analyzing packet data streams within the network, searching for unauthorized activity, such as attacks by hackers, and enabling users to respond to security breaches before systems are compromised. Typically, network intrusion detection systems analyze individual packets flowing through a network and can detect malicious packets that are designed to be overlooked by a firewall's simplistic filtering rules. Network intrusion detection systems may also be configured to look at the payload within a packet to see which particular web server program is being accessed and with what options, and to raise alerts when an attacker tries to exploit a bug in such code. When unauthorized activity is detected, the intrusion detection system can send alarms to a management console or system administrator with details of the activity and may also direct other systems to cut off the unauthorized sessions.

Network intrusion detection systems may be signature based, anomaly based, or a combination of both. The signature based intrusion detection system analyzes information it gathers and compares it to a large database of attack signatures. The system looks for a specific attack that has already been documented. In the anomaly based system, a system administrator defines the baseline, or normal state of the network's traffic load, breakdown, protocol, and typical packet size. The anomaly detector monitors network segments to compare their state to the normal baseline and look for anomalies. Conventional network intrusion detection devices are challenged with accurately detecting various intrusions hidden in ever increasing high-speed network traffic packets, either via intrusion signature matching or network traffic anomaly discovery approaches.

SUMMARY OF THE INVENTION

An intrusion detection and analysis system and method are disclosed. The system includes a data monitoring device comprising a capture engine operable to capture data passing through the network and configured to monitor network traffic, decode protocols, and analyze received data. The system further includes an intrusion detection device comprising a detection engine operable to perform intrusion detection on data provided by the data monitoring device. Application program interfaces are provided and configured to allow the intrusion detection device access to applications of the data monitoring device to perform intrusion to detection. The system also includes memory for storing reference network information used by the intrusion detection device to determine if an intrusion has occurred.

The reference network information may comprise a signature database including signature profiles associated with a known network security violation. The detection engine is operable to compare the data provided by the data monitoring device with the signature profiles to detect network intrusions. The reference network information may also comprise a baseline state of network traffic. The detection engine is operable to compare the data received by the capture engine to the baseline network state and look for anomalies.

A method of the present invention for performing intrusion detection with the intrusion detection and analysis system generally comprises receiving data at the data monitoring device and capturing at least a portion of the packets contained within the data. An application program interface configured to open applications of the data monitoring device is called and intrusion detection is performed at the intrusion detection device utilizing at least one of the applications of the data monitoring device.

In another aspect of the invention, a computer program product for performing intrusion detection with the intrusion detection and analysis system generally comprises code that receives data at the data monitoring device and captures at least a portion of the packets contained within the data. The product further includes code that calls an application program interface configured to open applications of the data monitoring device and performs intrusion detection at the intrusion detection device utilizing at least one of the applications of the data monitoring device. A computer-readable storage medium is provided for storing the codes.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
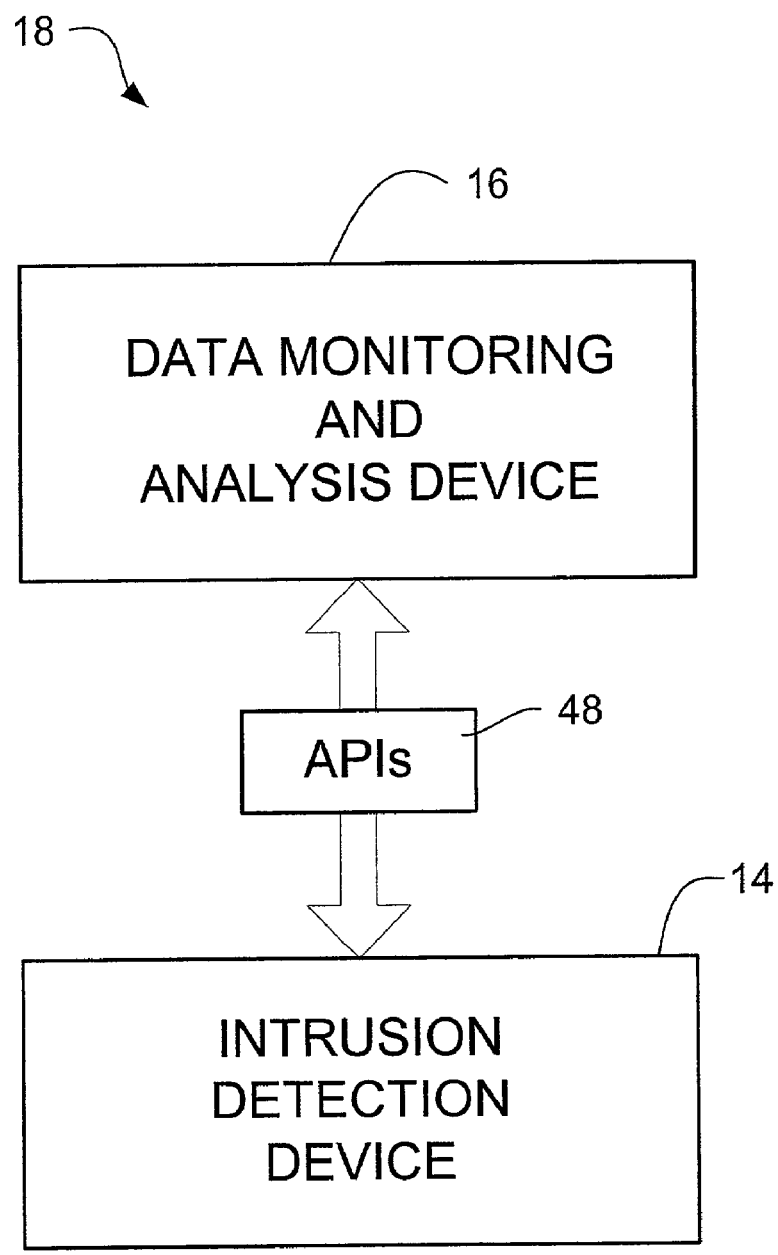
FIG. 1 is a block diagram illustrating a network intrusion detection and analysis system of the present invention.

Referring now to the drawings, and first to FIG. 1, a network intrusion detection and analysis system of the present invention is shown and generally indicated at 18. The present invention provides an intrusion detection device 14 in combination with a network analysis and data monitoring device 16 configured to perform fault and network performance management. As further described below, the system uses packet capturing and processing to perform both network analysis functions and signature matching or anomaly recognition for intrusion detection. The network analysis device is configured to provide network monitoring, protocol decoding, and analysis capabilities. The network analysis device may be, for example, a system such as SNIFFER™, available from Sniffer Technologies, a Network Associates Company. The combination of an intrusion detection device and a network analysis device allows for efficient detection of intrusions in high-speed network traffic since the functionality of system components can be used to perform dual simultaneous functions, or one function at a time.

Figure 2:
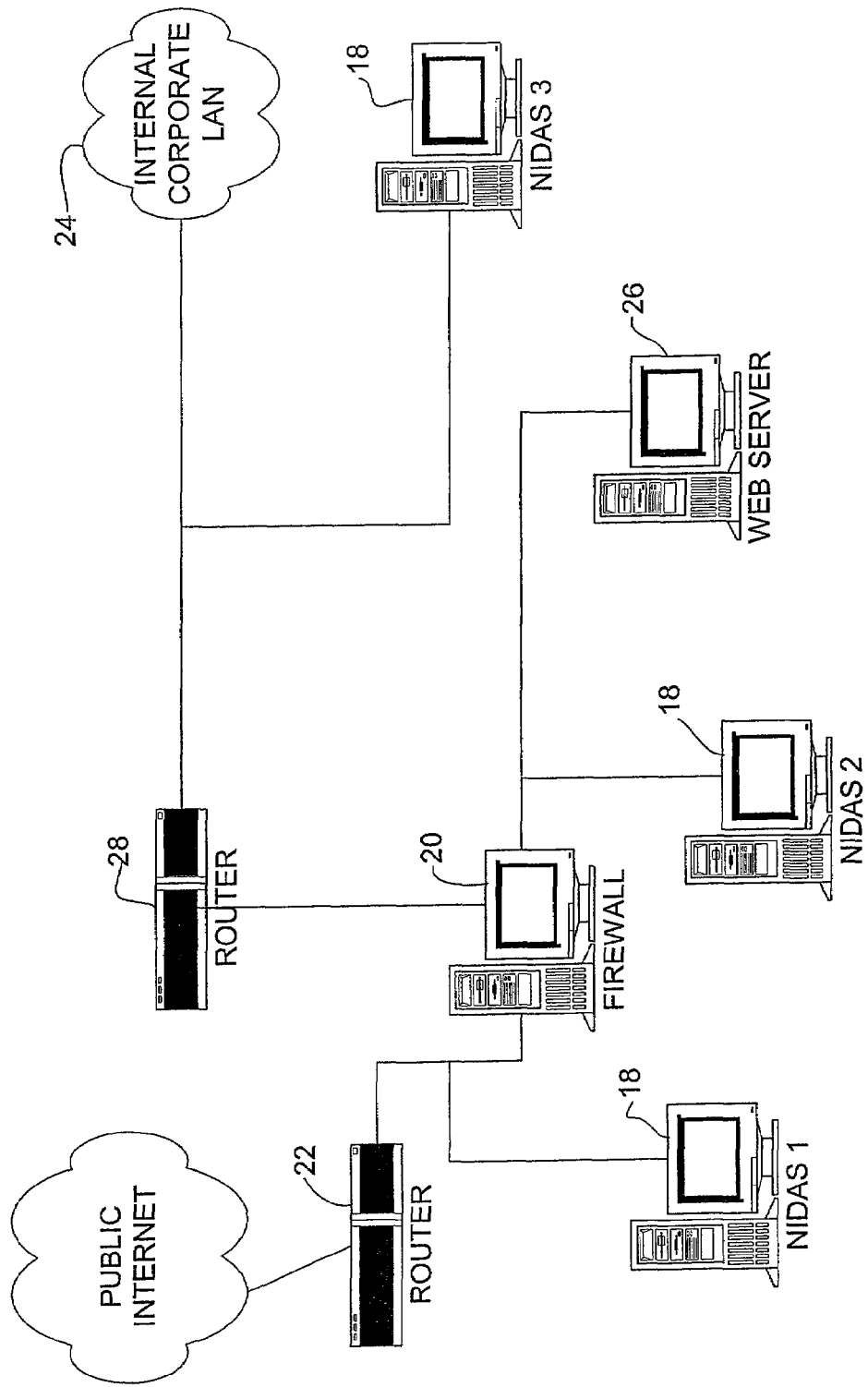
FIG. 2 is a diagram illustrating an example of network system containing network intrusion detection and analysis systems of the present invention.

The present invention operates in the context of a data communication network including multiple network elements. The network may be wireless, frame relay, T1 links, Gigabit Ethernet Local Area Networks (LANs), packet over SONET, Wide Area Networks (WANs), or Asynchronous Transfer Mode (ATM), for example. FIG. 2 illustrates an exemplary network incorporating intrusion detection and analysis systems 18 of the present invention. The network intrusion detection and analysis system (NIDAS) 18 may be placed at key points throughout the network. The units monitor network traffic, perform local analysis of the traffic, and report attacks to a central management station (e.g., system administrator). The network intrusion detection and analysis systems 18 are preferably placed on the network perimeter including both sides of a firewall 20 (e.g., between router 22 and the Internet), near a web server 26, and on links to internal or partner networks (e.g., between router 28 and internal corporate network 24). For example, NIDAS 1 monitors all traffic passing into and out of the internal network. NIDAS 1 provides an early warning since it detects reconnaissance port scans that typically indicate the start of hacker activity. From this point, NIDAS 1 can document the number and types of attacks originating on the Internet that target the network. NIDAS 2 monitors traffic that has passed through the firewall 20. NIDAS 3 monitors traffic passing into and out of internal corporate LAN 24. It is to be understood that the network of FIG. 2 is only one example illustrating placement of NIDSs within a network and that the present invention may be used on different types of networks and placed in various locations throughout the network. For example, some devices may be used as traditional data monitoring and analysis devices while other devices may be used as intrusion detection devices. Furthermore, it is to be understood that the system of the present invention may also be used in networks which are not connected to the Internet and may be used, for example, in intranets or any other type of network.

The network intrusion detection and analysis system 18 preferably provides both signature matching and anomaly detection. However, the system may be configured to perform only one type of detection. As further described below, the signature based intrusion detection system performs packet capturing, protocol decoding, signature matching, and alert/alarm generation and report. The anomaly based intrusion detection system includes packet capturing, protocol decoding, network statistics gathering, abnormality discovering, and alert/alarm generation and reporting. Functions such as packet capturing, protocol decoding, network statistics gathering, network traffic diagnosis, and alert/alarm generation and reporting are provided by the network analysis device. These applications are leveraged by the intrusion detection system to provide an efficient network intrusion detection system which may be provided in combination with network analysis and management.

Figure 3:
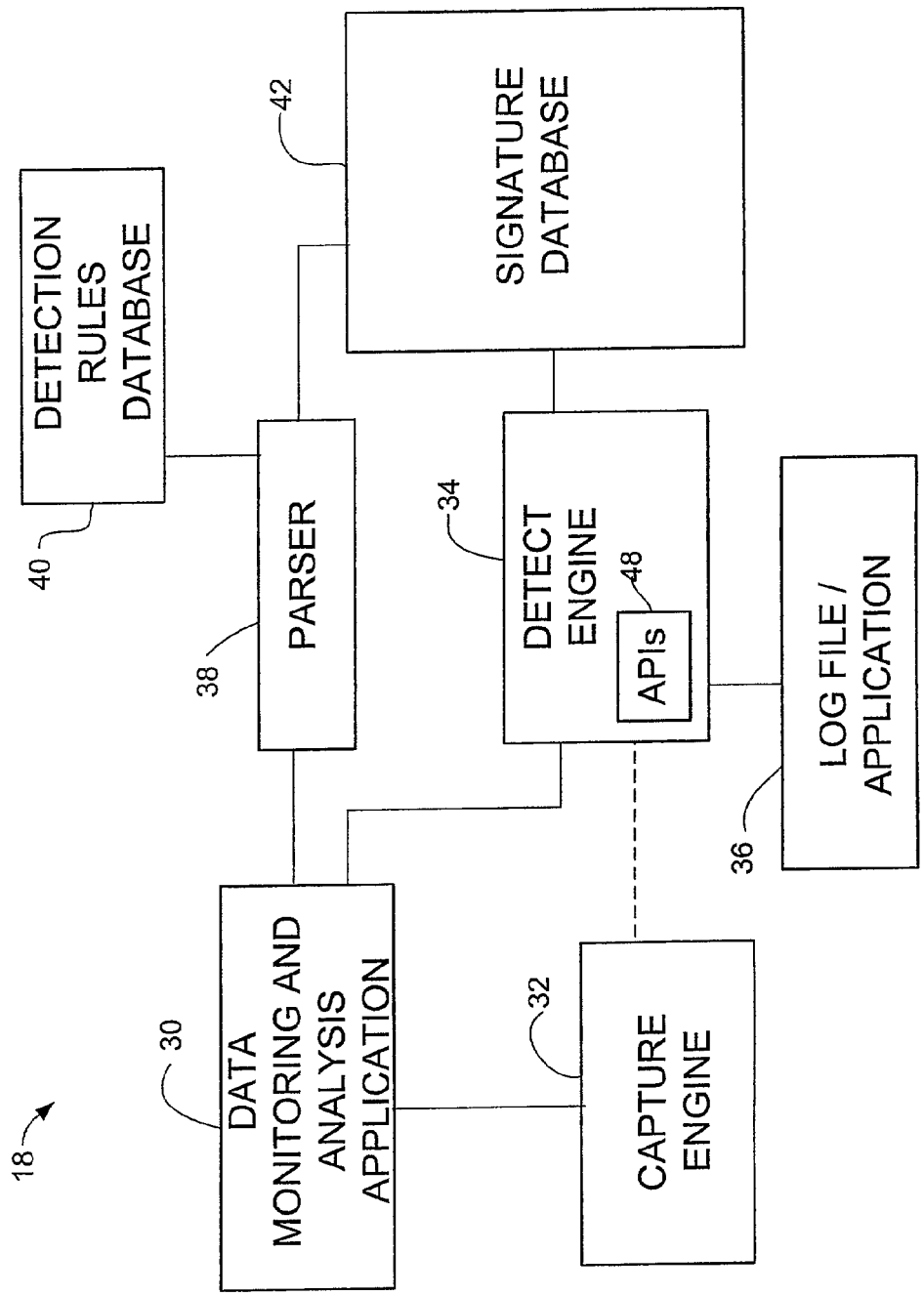
FIG. 3 is a block diagram illustrating details of the network intrusion detection and analysis system of the present invention.

FIG. 3 shows a block diagram illustrating details of the intrusion detection and analysis system 18 of the present invention. The system includes a network analysis application 30, capture engine 32, detect engine 34, log file 36, parser 38, rules database 40, and signature database 42. The analysis application 30 provides network analysis and management capabilities. For example, the network analysis application 30 may detect broken lines and heavy workloads, identify network errors, and analyze traffic load. The analysis application 30 may also be used to perform anomaly intrusion detection. The analysis application 30 preferably constructs profiles representing normal behavior of users, hosts, or network connections. These profiles are constructed from historical data collected over a period of normal operation. The application then collects event data and uses a variety of measures to determine when monitored activity deviates from the normal baseline. The application 30 may use threshold detection or statistical measures, for example.

The analysis application 30 receives packets from capture engine 32. The capture engine 32 receives packets from the network and forwards the packets to the analysis application 30 for higher level analysis. The capture engine 32 may also save packets for later analysis if the engine cannot process all the packets passing through the network. The parser 38 is coupled to the network analysis application 30, detection rules database 40, and signature database 42. An initialization routine is called in the analysis application 30 to parse the signatures and detection rules and set up other internal data structures. The signatures are provided to the parser 38 which generates code to be used by detect engine 34. The detect engine 34 analyzes the packets to see if there is an intrusion embedded in the packet. Information on detected intrusions is sent to the log file 36, which is available, for example, to a system administrator. The log file 36 may also include an application that generates alarms for the system administrator. The log file 36 may generate routine reports and other detailed information. A report may contain, for example, system events and intrusions detected over a reporting period. The system may use both active and passive measures when an intrusion is detected. Active measures may involve some automated intervention on part of the system to disconnect or counterattack intruders. The passive measures involve reporting intrusion detection system findings to a system administrator, security officer, or other personnel, who can then take action based on the reports.

The rules may be in the format of SNORT (an Open Source Network Intrusion Detection System), for example. When a packet matches a specified rule pattern, the packet may be passed, logged, or generate an alert. The pass rules drop the packet. Log rules write the full packet to the logging routine that was selected by a system administrator. Alert rules generate an event notification using the method specified by the system administrator, and then log the full packet using the selected logging mechanism to enable later analysis. Pattern matching may be performed using various algorithms, as is well known by those skilled in the art. Rules may also be used to limit the amount of data that has to be searched. For example, many buffer overflows use variable offsets to tune the size and placement of the exploit machine code. Web CGI probes and attacks generally all take place at the beginning of the packet within the first thirty or fifty bytes.

Application program interfaces (APIs) 48 are used to open applications of the network analysis device 16 (FIGS. 1 and 3). The APIs 48 are used to parse, generate and load signatures, invoke corresponding signature detection methods from appropriate protocol contexts, access states required for stateful intrusion detection, and access alerts/alarms management facilities. The APIs may be of the form frame_context_pointer_position, and include, for example:

frame_tcp_bridge frame_udp_bridge frame_ip_bridge frame_http_bridge

Figure 4:
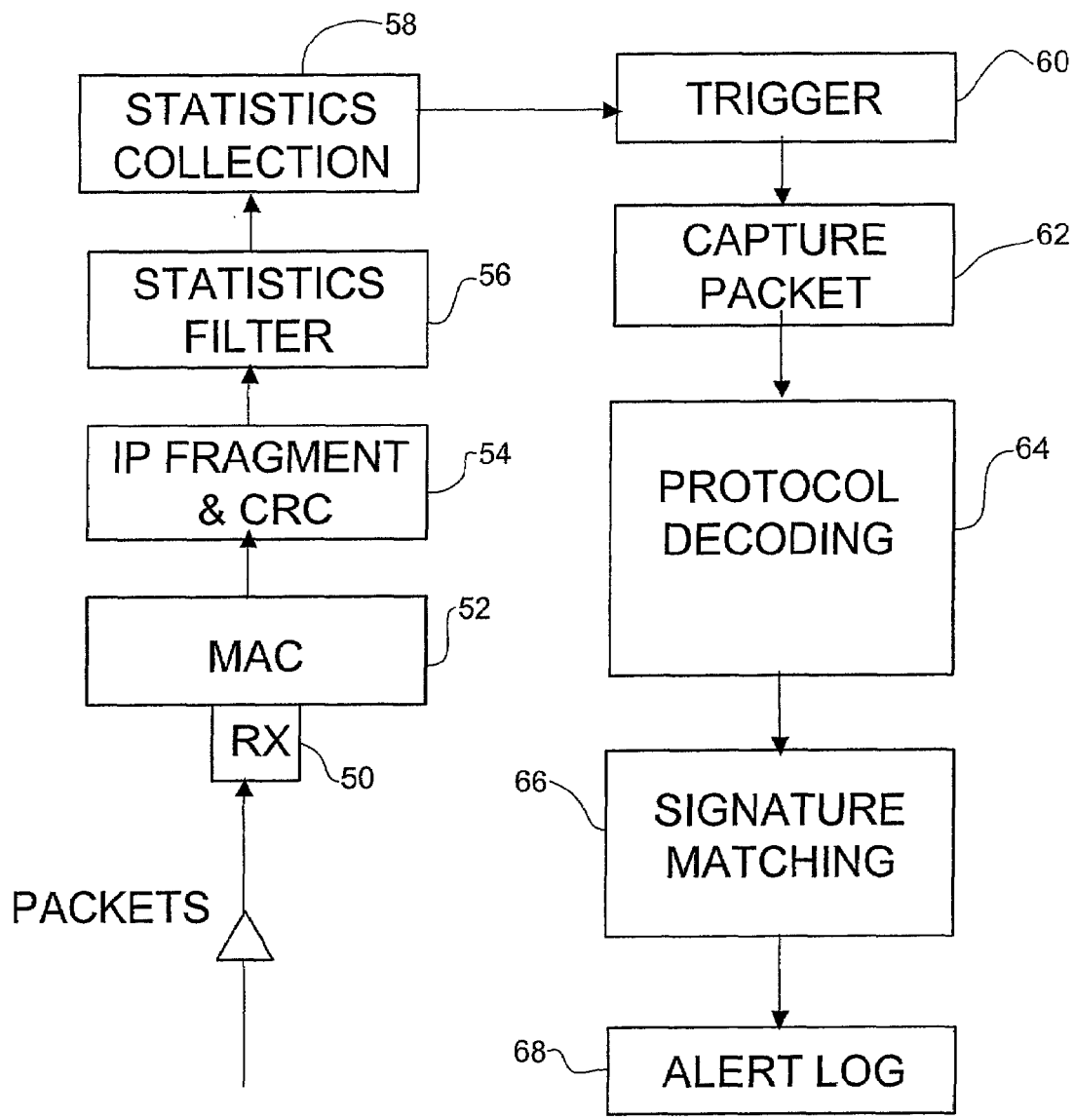
FIG. 4 is an example of a packet flow diagram for the network intrusion detection and analysis system of the present invention.

FIG. 4 illustrates packet flow through the network intrusion detection and analysis system 18. The system preferably receives raw network packets and uses a network adaptor that listens and analyzes all traffic in real-time as it travels across the network. The packets are received at receiving port (RX) 50 at the MAC (Medium Access Control) layer 52. The packets then pass through IP fragment and CRC (Cyclic Redundancy Checking) 54. A statistics filter 56 filters out unwanted packets. The filter 56 determines which data to examine more closely and screens out all other network traffic. Filter 56 improves system performance by allowing known nonmalicious traffic to be filtered out. Network statistics are then collected at a statistics collection application 58. A trigger 60 is used to trigger the capture engine 32 to capture packets at 62. The packets are either analyzed in real time or temporarily stored for later analysis. Data may be captured, for example, at a buffer at the full-line rate for a short duration, with subsequent analysis of the buffered data at a slower pace. Protocol decoding 64 is provided to decode a wide range of protocols covering all of the Open System Interconnection (OSI) layers to provide detailed data and analysis. Detailed decoding allows visibility into the network regardless of the speed or topology. The packets may be grouped into different protocol presentations and the packets assembled into high level protocol groups for analysis. Signature matching 66 is then performed to detect network intrusion. Any problems detected are sent to an alert log 68 and appropriate action is taken.

Figure 5:
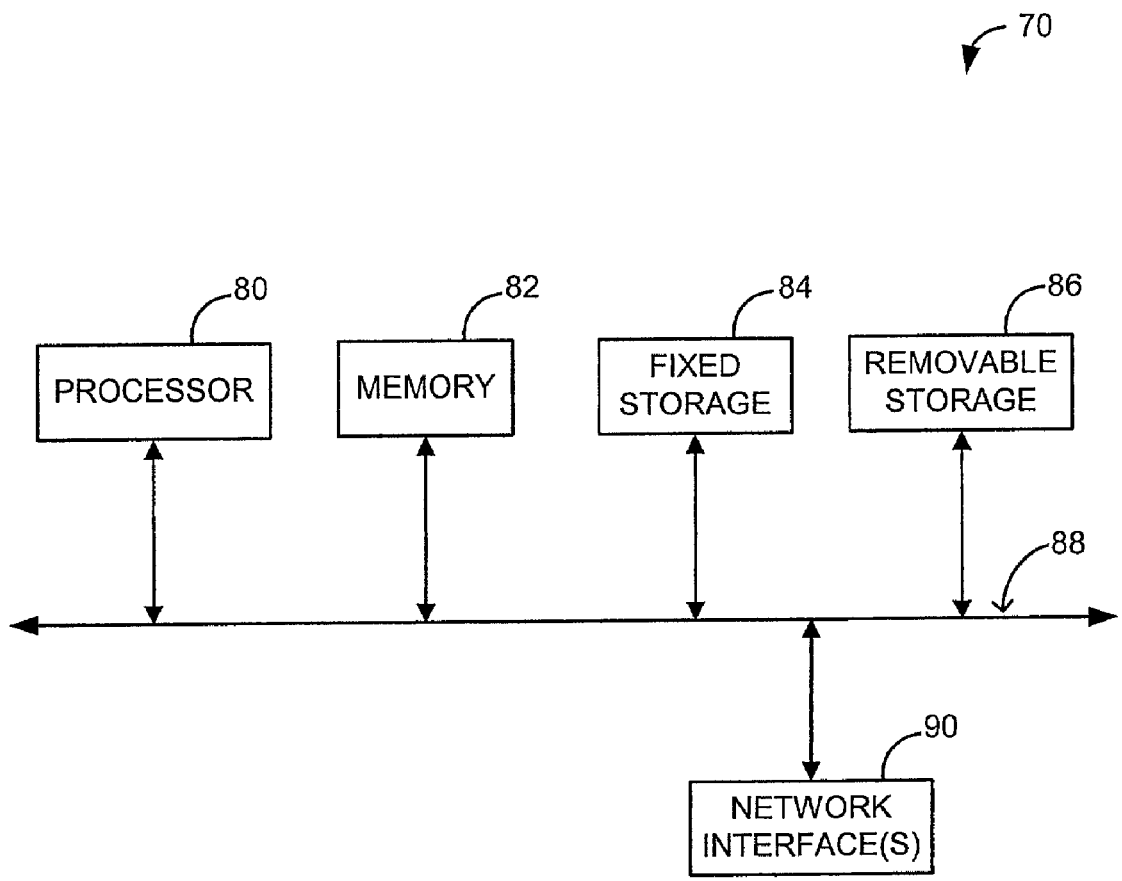
FIG. 5 is a diagram illustrating a computer system that may be used to execute software of this invention.

FIG. 5 shows a system block diagram of a computer system, generally indicated at 70, that may be used within the network to execute software of an embodiment of the invention. The computer system may include subsystems such as a central processor 80, system memory 82, removable storage 86 (e.g., CD-ROM drive), and a hard drive 84 which can be utilized to store and retrieve software programs incorporating computer code that implements aspects of the invention, data for use with the invention, and the like. The computer readable storage may also include tape, flash memory, or system memory. Additionally, a data signal embodied in a carrier wave (e.g., in a network including the Internet) may be the computer readable storage medium. The computer system 70 may further include a display screen, keyboard, and mouse which may include one or more buttons for interacting with a GUI (Graphical User Interface). Other computer systems suitable for use with the invention may include additional or fewer subsystems. For example, the computer system 70 may include more than one processor 80 (i.e., a multi-processor system) or a cache memory.

The system bus architecture of the computer system 70 is represented by arrows 88 in FIG. 5. However, these arrows are only illustrative of one possible interconnection scheme serving to link the subsystems. For example, a local bus may be utilized to connect the central processor 80 to the system memory 82. The components shown and described herein are those typically found in most general and special purpose computers and are intended to be representative of this broad category of data processors. The computer system 70 shown in FIG. 5 is only one example of a computer system suitable for use with the invention. Other computer architectures having different configurations of subsystems may also be utilized.

Communication between computers within the network is made possible with the use of communication protocols, which govern how computers exchange information over a network. The computer may include an input/output circuit used to communicate information in appropriately structured form to and from the parts of computer and associated equipment. Connected to the input/output circuit are inside and outside high speed Local Area Network interfaces 90, for example. The inside interface may be connected to a private network, while the outside interface may be connected to an external network such as the Internet. Preferably, each of these interfaces includes a plurality of ports appropriate for communication with the appropriate media, and associated logic, and in some instances memory.

As can be observed from the foregoing, the system and method of the present invention provide numerous advantages. The system and method of the present invention reduces downtime caused by undetected attacks, resulting in greater availability of systems to conduct internal operations and complete transactions over the Internet or other communication network.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. An intrusion detection and analysis system comprising:

a data monitoring device comprising a capture engine operable to capture data passing through the network in response to a trigger and configured to monitor network traffic, decode protocols for grouping packets into different protocol presentations and assembling the packets into high level protocol groups, and analyze received data for managing the network by collecting statistics, and detecting broken lines, traffic loads, and network errors;

an intrusion detection device separate from the data monitoring device, the intrusion detection device comprising a detection engine operable to perform intrusion detection on data provided by the data monitoring device;

application program interfaces configured to allow the intrusion detection device access to applications of the data monitoring device to perform intrusion detection; and memory for storing reference network information used by the intrusion detection device to determine if an intrusion has occurred;

wherein the application program interfaces allow the intrusion detection device to leverage the separate data monitoring device, by allowing the intrusion detection device to call an application program interface configured to open a protocol decoding application associated with the separate data monitoring device, and by allowing the intrusion detection device to call an application program interface configured to open an alarm generation application associated with the separate data monitoring device.

2. The system of claim 1 wherein the reference network information comprises a signature database including signature profiles associated with a known network security violation and wherein the detection engine is operable to compare the data provided by the data monitoring device with the signature profiles to detect network intrusions.

3. The system of claim 2 further comprising a parser operable to parse, generate, and load signatures at the detection engine.

4. The system of claim 1 wherein the reference network information comprises a baseline state of network traffic and wherein the detect engine is operable to compare the data received by the capture engine to the baseline network state and look for anomalies.

5. The system of claim 4 wherein the data monitoring device provides the baseline state of network traffic.

6. The system of claim 1 further comprising a log file configured to at least temporarily store reports generated by the detect engine.

7. The system of claim 6 further comprising an alarm manager operable to generate alarms based on information generated by the log file.

8. The system of claim 1 further comprising a filter configured to filter out packets received at the data monitoring device.

9. The system of claim 1 wherein the capture engine is configured to forward packets and temporarily store packets for later analysis by the data monitoring device.

10. A method for performing intrusion detection with an intrusion detection and analysis system comprising a data monitoring device including a capture engine operable to capture data passing through the network in response to a trigger and configured to monitor network traffic, decode protocols for grouping packets into different protocol presentations and assembling the packets into high level protocol groups, and analyze received data for managing the network by collecting statistics, and detecting broken lines, traffic loads, and network errors, and an intrusion detection device separate from the data monitoring device, the intrusion detection device coupled to the data monitoring device and configured to perform intrusion detection on data provided by the data monitoring device; the method comprising:

receiving data at the data monitoring device;

capturing at least a portion of the packets contained within the data;

by allowing the intrusion detection device to call at least one application program interface configured to open applications of the data monitoring device; and performing intrusion detection at the intrusion detection device utilizing at least one of the applications of the data monitoring device;

wherein the at least one application program interface allows the intrusion detection device to leverage the separate data monitoring device, by allowing the intrusion detection device to call an application program interface configured to open a protocol decoding application associated with the separate data monitoring device, and by allowing the intrusion detection device to call an application program interface configured to open an alarm generation application associated with the separate data monitoring device.

11. The method of claim 10 further comprising filtering the data prior to capturing packets.

12. The method of claim 10 wherein performing intrusion detection comprises performing signature matching.

13. The method of claim 12 wherein the application program interfaces provide parsing of signatures used in signature matching.

14. The method of claim 10 wherein performing intrusion detection comprises detecting anomalies in the received data.

15. A computer program product for performing intrusion detection with an intrusion detection and analysis system comprising a data monitoring device including a capture engine operable to capture data passing through the network in response to a trigger and configured to monitor network traffic, decode protocols for grouping packets into different protocol presentations and assembling the packets into high level protocol groups, and analyze received data for managing the network by collecting statistics, and detecting broken lines, traffic loads, and network errors, and an intrusion detection device separate from the data monitoring device, the intrusion detection device coupled to the data monitoring device and configured to perform intrusion detection on data provided by the data monitoring device; the product comprising:

code that receives data at the data monitoring device;

code that captures at least a portion of the packets contained within the data;

code that calls at least one application program interface configured to open applications of the data monitoring device;

code that performs intrusion detection at the intrusion detection device utilizing at least one of the applications of the data monitoring device; and a computer-readable storage medium for storing the codes;

wherein the at least one application program interface allows the intrusion detection device to leverage the separate data monitoring device, by allowing the intrusion detection device to call an application program interface configured to open a protocol decoding application associated with the separate data monitoring device, and by allowing the intrusion detection device to call an application program interface configured to open an alarm generation application associated with the separate data monitoring device.

16. The computer program product of claim 15 wherein the computer readable storage medium is selected from the group consisting of CD-ROM, floppy disk, tape, flash memory, system memory, and hard drive.

* * * * *